(12) United States Patent  
Rodgers et al.

(10) Patent No.: US 9,117,231 B2
(45) Date of Patent: Aug. 25, 2015

(54) ORDERING METHOD AND SYSTEM FOR RESTAURANTS

(75) Inventors: Daniel Michael Rodgers, Edinburgh (GB); Ronald Forbes, Midlothian (GB)

(73) Assignee: QIKSERVE LIMITED (GB)

( * ) Notice: Subject to any disclaimer, the term of this patent is extended or adjusted under 35 U.S.C. 154(b) by 103 days.

(21) Appl. No.: 13/615,512

(22) Filed: Sep. 13, 2012

(65) Prior Publication Data

US 2013/0191229 A1 Jul. 25, 2013

Related U.S. Application Data

(60) Provisional application No. 61/590,496, filed on Jan. 25, 2012.

(51) Int. Cl.
*G06Q 30/00* (2012.01)
*G06Q 30/06* (2012.01)

(52) U.S. Cl.
CPC .................................. *G06Q 30/06* (2013.01)

(58) Field of Classification Search
None
See application file for complete search history.

(56) References Cited

U.S. PATENT DOCUMENTS

| | | | | |
|---|---|---|---|---|
| 5,838,798 A * | 11/1998 | Stevens, III | ...................... | 705/21 |
| 5,845,263 A * | 12/1998 | Camaisa et al. | ................ | 705/15 |
| 8,041,605 B1 * | 10/2011 | Harrity | ............................ | 705/15 |
| 2004/0054592 A1 * | 3/2004 | Hernblad | ........................ | 705/15 |
| 2004/0087367 A1 * | 5/2004 | Hendrickson | ................... | 463/42 |
| 2004/0158494 A1 * | 8/2004 | Suthar | .............................. | 705/15 |
| 2009/0089183 A1 * | 4/2009 | Afram et al. | .................... | 705/27 |
| 2009/0192898 A1 * | 7/2009 | Baril | ................................ | 705/14 |
| 2009/0281903 A1 * | 11/2009 | Blatstein | ......................... | 705/15 |
| 2011/0231266 A1 * | 9/2011 | Baril | ................................ | 705/15 |
| 2012/0206237 A1 * | 8/2012 | Lovegreen | ................... | 340/10.1 |

FOREIGN PATENT DOCUMENTS

DE 1020070190822 10/2008

OTHER PUBLICATIONS

PCT Written Opinion mailed on Apr. 29, 2013 for PCT Application No. PCT/GB2013/050158 filed Jan. 24, 2013 in the name of Qikserve Limited.
PCT International Search Report mailed on Apr. 29, 2013 for PCT Application No. PCT/GB2013/050158 filed Jan. 24, 2013 in the name of Qikserve Limited.

* cited by examiner

*Primary Examiner* — Fateh Obaid
(74) *Attorney, Agent, or Firm* — One3 IP Management, P.C.; Jeromye V. Sartain

(57) ABSTRACT

A method of ordering menu items for delivery to a station at a premises, such as a table at a restaurant, includes the steps: Launch App; Scan QR code or NFC tag on table; Identify location. The location is identified using the restaurant and table identifier(s) extracted from the QR code. This location is used to identify the correct restaurant menu from the central platform database; Download menu; Add menu items to order; Confirm order; Pay order; Route order. The restaurant identifier is used to determine the appropriate EPOS adaptor based on the EPOS system in use by the specific restaurant; Transmit to restaurant. The correct communication protocol and authentication details are then used in order to route the order to the restaurant EPOS system or printer.

16 Claims, 5 Drawing Sheets

ORDERING METHOD AND SYSTEM FOR RESTAURANTS

CROSS REFERENCE TO RELATED APPLICATIONS

The present application claims priority to U.S. Provisional Application No. 61/590,496 filed on Jan. 25, 2012, which is incorporated herein by reference in its entirety.

FIELD

The present disclosure relates to methods and systems for ordering menu items for delivery to stations at premises, such as tables at restaurants, and relates to tags, such as with QR codes, for use in such methods.

BACKGROUND

Fast casual restaurants traditionally have not benefited from customer self-service efficiencies that other industries have achieved. Fast-casual restaurants operate a number of service models including waited service, counter service, and semi-counter service. Waited service means that waiters provide service to customers at their table. This is convenient for the customer, but labour costs are typically 30% of the restaurant overheads. Counter service is where a customer orders from a counter and waits to collect the food and drink. This is cost-effective to run but inconvenient for the customer. Semi-counter service where a customer selects a table, chooses from a menu, and then places an order at the counter or bar giving the table number are almost as cost-effective to run, but are inconvenient for the customer. The customer must leave the table and queue at the bar to place an order. This can be very difficult when supervising young children or with valuables such as a handbag or laptop computer etc. It may be necessary to take the children or valuables to the bar and risk losing the table to other diners. In group situations it is also necessary to remember a large order and it causes social disruption when someone has to leave the group to go to the bar.

Mobile Apps (applications) currently exist for placing orders with takeaway restaurants for delivery or collection. These typically use the GPS (Global Positioning System) on the mobile device to identify the user's location and present a list of local takeaway restaurants. Orders are then sent electronically to the restaurant for collection or delivery.

This solution is not suitable for an in-restaurant ordering system as GPS does not work indoors, and so an alternative approach is desirable for locating the customer.

These takeaway ordering systems also transmit the order to the restaurant in a standardized way and there is a problem of routing the order to the appropriate restaurant EPOS system using the required protocol and network.

QR (Quick Response) codes are commonly used to store web page URLs (Uniform Resource Locators) which direct the mobile phone browser to a pre-determined web page. However this is a fixed URL and does not allow for the identification of a particular location.

SUMMARY

Embodiments provide a simple, effective solution to the problems identified above.

According to a first aspect of the present disclosure, there is provided a method of ordering menu items for delivery to a station at a premises using a processor, the method comprising the steps:

(a) receiving a station input, the station input comprising a station identifier and a premises identifier together identifying the station at the premises;

(b) retrieving a menu comprising menu items using the premises identifier;

(c) causing output of the retrieved menu;

(d) receiving an order input, the order input indicating a selection of at least one of the output menu items; and (e) the processor causing transmission of an order to the premises identified by the input premises identifier, the order including the station identifier and the selection of the output menu items.

The station may comprise a table.

The station input may be received by a processor reading a barcode at the station.

The barcode may comprise the station identifier and the premises identifier.

The station input may be received by a processor reading a QR code comprising the encoded station and premises identifiers.

The station input may be received by a processor reading a transmission from an electronic tag at the station.

The transmission from the electronic tag may comprise the station identifier and the premises identifier.

The station input may be by user entry of the station identifier and the premises identifier.

The menu may be retrieved from a server remote from the premises.

The menu may be automatically configured for the premises based on time of day.

The method may further comprise the step of receiving a third input, the third input indicating placing the order for the selection of the output menu items.

The method may further comprise the step of selecting an EPOS adapter based on the premises identifier and wherein the processor causes transmission of the order to the premises using the selected EPOS adapter.

The method may further comprise the step of selecting a communication protocol based on the premises identifier and wherein the processor causes transmission of the order to the premises using the selected communication protocol.

The method may further comprise the step of selecting a communication network based on the premises identifier and the processor causes transmission of the order to the premises using the selected communication network.

Steps (b) to (d) may be performed before steps (a) and (e).

According to a second aspect of the present disclosure, there is provided a method of delivering products to a station at a premises, the method comprising ordering menu items in accordance with the method of the first aspect and delivering to the station at the premises at least one product corresponding to the selection of the output menu items.

According to a third aspect of the present disclosure, there is provided a computer program product one or more sequences of machine-readable instructions for use in ordering menu items for delivery to a station at a premises, the instructions being adapted to:

first computer readable program code for causing at least one computer to receive a station input, the station input comprising a station identifier and a premises identifier together identifying the station at the premises;

cause at least one computer to retrieve a menu comprising menu items using the premises identifier;

cause at least one computer to cause output of the retrieved menu;

cause at least one computer to receive an order input, the order input indicating a selection of at least one of the output menu items; and cause at least one computer to cause transmission of an order to the premises identified by the input premises identifier, the order including the station identifier and the selection of the output menu items.

According to a fourth aspect of the present disclosure, there is provided a tag for use in ordering menu items for delivery to a station at a premises using a processor, the tag comprising a station identifier and a premises identifier identifying the station at the premises.

The station may comprise a table.

The tag, such as a label, may comprise a barcode encoding the station identifier and the premises identifier.

The tag may comprise an electronic tag operable to transmit the station identifier and the premises identifier.

According to a fifth aspect of the present disclosure, there is provided a substrate patterned with a QR code comprising a patterned region comprising QR encoded station and premises identifiers.

According to a sixth aspect of the present disclosure, there is provided a system for ordering menu items for delivery to a station at a premises, the system comprising:

a mobile device operable to:

(a) receive a station input, the station input comprising a station identifier and a premises identifier together identifying the station at the premises;

(b) retrieve a menu comprising menu items using the premises identifier;

(c) output the retrieved menu; and (d) receive an order input, the order input indicating a selection of at least one of the output menu items, and the system further comprising a server remote from the premises operable to cause transmission of an order to the premises identified by the input premises identifier, the order including the station identifier and the selection of the output menu items.

According to a seventh aspect of the present disclosure, there is provided a computer program product comprising one or more sequences of machine-readable instructions for use in accordance with the method of the first aspect, the instructions being adapted to cause at least one computer to cause transmission of the order to the premises identified by the input premises identifier, the order including the station identifier and the selection of the output menu items.

LIST OF DRAWINGS

Embodiments of the disclosure will now be described, by way of example only, with reference to the accompanying schematic drawings in which corresponding reference symbols indicate corresponding parts, and in which.

DETAILED DESCRIPTION

Figure 1:
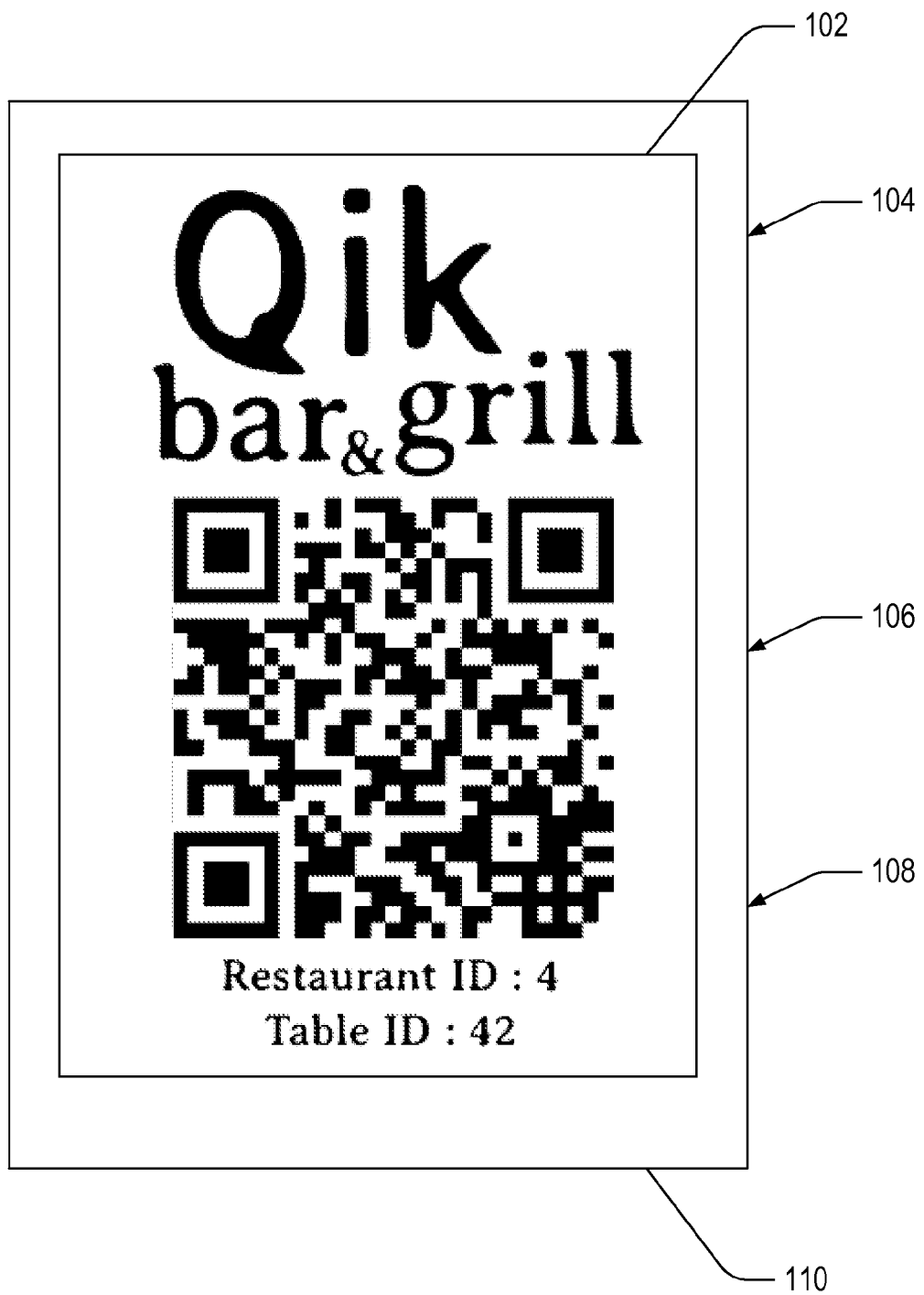
FIG. 1 illustrates a QR code label for use on a restaurant table in accordance with an embodiment of the present disclosure.

Embodiments enable a customer to order using their mobile phone. In an embodiment the customer uses a downloaded smartphone application ("App") and "checks-in" by using the App to scan a QR (Quick Response) code on the table using the smartphone camera.

The QR code contains the table location information, namely the restaurant identifier and table number/identifier.

In an embodiment the appropriate menu for that particular restaurant and time of day is automatically identified and downloaded to the smartphone. For example, a breakfast menu may be presented between the hours of 6 am and 11 am. Individual restaurants may also have particular specials on offer.

In an embodiment the user can choose individual categories such as "Starters", "Mains", "Desserts", "Drinks", etc. Within the category, the relevant individual menu items are shown. The user can then add items to the order along with special instructions etc.

In an embodiment the user can review the order before paying with one of the normal methods such as a credit card. The payment details may be stored for convenience during subsequent use of the App.

In an embodiment the order is automatically sent to the restaurant kitchen. This can be done in a number of ways such as printing to a remote printer, or via integration with the existing restaurant EPOS (Electronic Point of Sale) system.

The food and drink may then be delivered to the table by the waiter in the usual way.

Along with the QR code, other information including the restaurant and table identifiers may be printed in human-readable form.

Scanning a QR code is much more convenient and accurate than keying-in restaurant and table identifiers. Consumers are now becoming more familiar with scanning QR codes to access online information. A QR code is commonly used on advertising material such as in magazines to access further information on the product. These QR codes contain the URL to access the relevant online web page.

The user can be identified using a unique identifier from the mobile device itself, or through storing login credentials.

The App may be conveniently available for major smartphone operating systems including Apple iOS™, Android™, Blackberry™, and Windows Phone™. The App may be installed on the smartphone by downloading from one of the App stores such as the Apple Appstore™, Google Play™, etc.

Installing a dedicated system in every restaurant would be a simple approach as the issue of identifying the restaurant, menu, and EPOS system is not a problem. The App would however need to connect to the local system perhaps over a WiFi network. This would require setting up the appropriate authentication and security information and would be difficult for a typical end user to achieve. Installing a dedicated system for each restaurant would also be costly to install and maintain.

In order to address these issues, an embodiment is provided as a hosted service where the smartphone App connects to a platform over the internet and the order is delivered by the system to the appropriate restaurant's EPOS system or kitchen printer. This enables a scalable solution where it is not necessary to install a dedicated system for every restaurant.

In an embodiment, a database stores the restaurant, customer, order, and payment information. The remote EPOS system or printer connection and authentication information may also be stored.

The restaurant identifier together with the time of day is used to extract the appropriate menu from the database. Payment is achieved by submitting the user's payment card details to a payment gateway. The order is then routed via the appropriate protocol to the appropriate EPOS system.

There are many EPOS system providers including companies such as Radiant Systems™, Micros™, Zonal™, etc. EPOS providers support varying types of protocols for connection to those systems. The communication protocols are proprietary and interface methods used range from web service interfaces down to TTY protocols. Web service interfaces may use SOAP (Simple Object Access Protocol) or REST (Representative State Transfer) technologies and use http over internet protocol (IP) as the underlying communication method.

Remote connection to an EPOS system uses a secure wide-area network (WAN). The WAN type may be a dedicated line, dial-up modem or broadband connection. For security over the internet, a VPN (Virtual Private Network) connection is often used.

In an embodiment, the restaurant identifier is used to determine the appropriate EPOS adaptor based on the EPOS system in use by the specific restaurant. The correct communication protocol and authentication details are then used in order to route the order to the restaurant EPOS system or printer.

FIG. 1 illustrates a tag, in this embodiment a QR code label, for use on a restaurant table in accordance with an embodiment of the present disclosure. With reference to FIG. 1, a QR code label 102 has an area 104 displaying the logo of the restaurant, a QR code barcode 106 and a text area 108 printed with human readable restaurant and table identifiers, to assist in correct placement of the label. The label is shown on a table 110 (not to scale).

Figure 2:
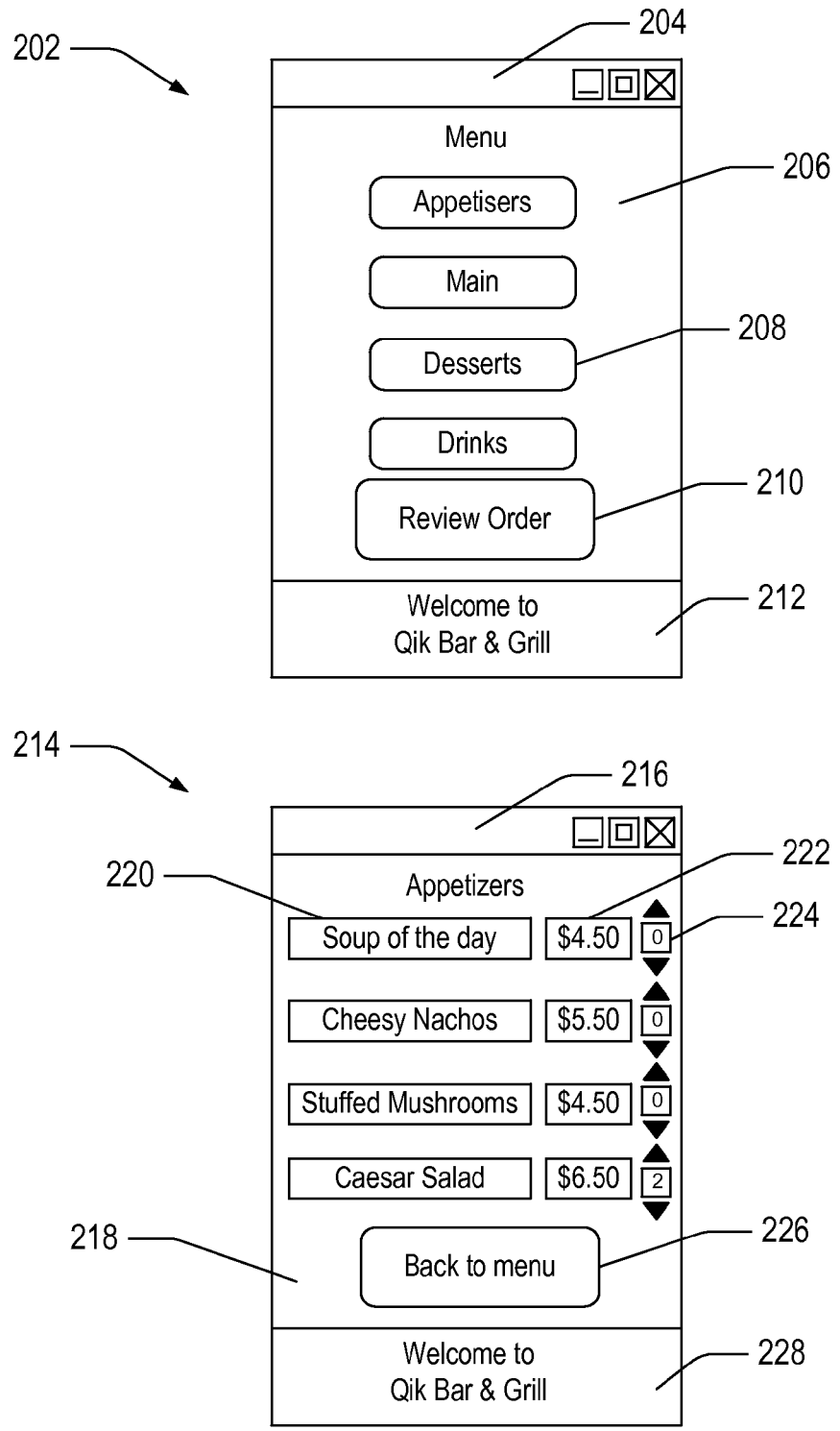
FIG. 2 illustrates category and item selection screens for an App in accordance with an embodiment of the present disclosure.

FIG. 2 illustrates category and item selection screens of the smartphone App. With reference to FIG. 2, a category selection screen 202 is shown schematically, as displayed on the display of the smartphone by the App. The category selection screen 202 has a navigation area 204 and product category menu area 206 with buttons for the user to select categories such as appetizers, main, desserts 208 and drinks A review order button 210 is also provided by the App. A message area 212 is also provided for example for a message and/or logo of the restaurant.

An item selection screen 214 is also shown schematically, in this case for appetizers, as displayed on the display of the smartphone by the App. The item selection screen 214 has a navigation area 216 and an item selection area 218 with pairs of item display fields for description 220 and price 222, each pair accompanied by a quantity control 224 for the user to input a quantity of each item for the order. In this example, the items are soup of the day 220, cheesy nachos, stuffed mushrooms or Caesar salad. A back to menu button 226 is also provided by the App to allow the user to return to the category selection screen 202. A message area 228 is again provided for example for a message and/or logo of the restaurant.

Figure 3:
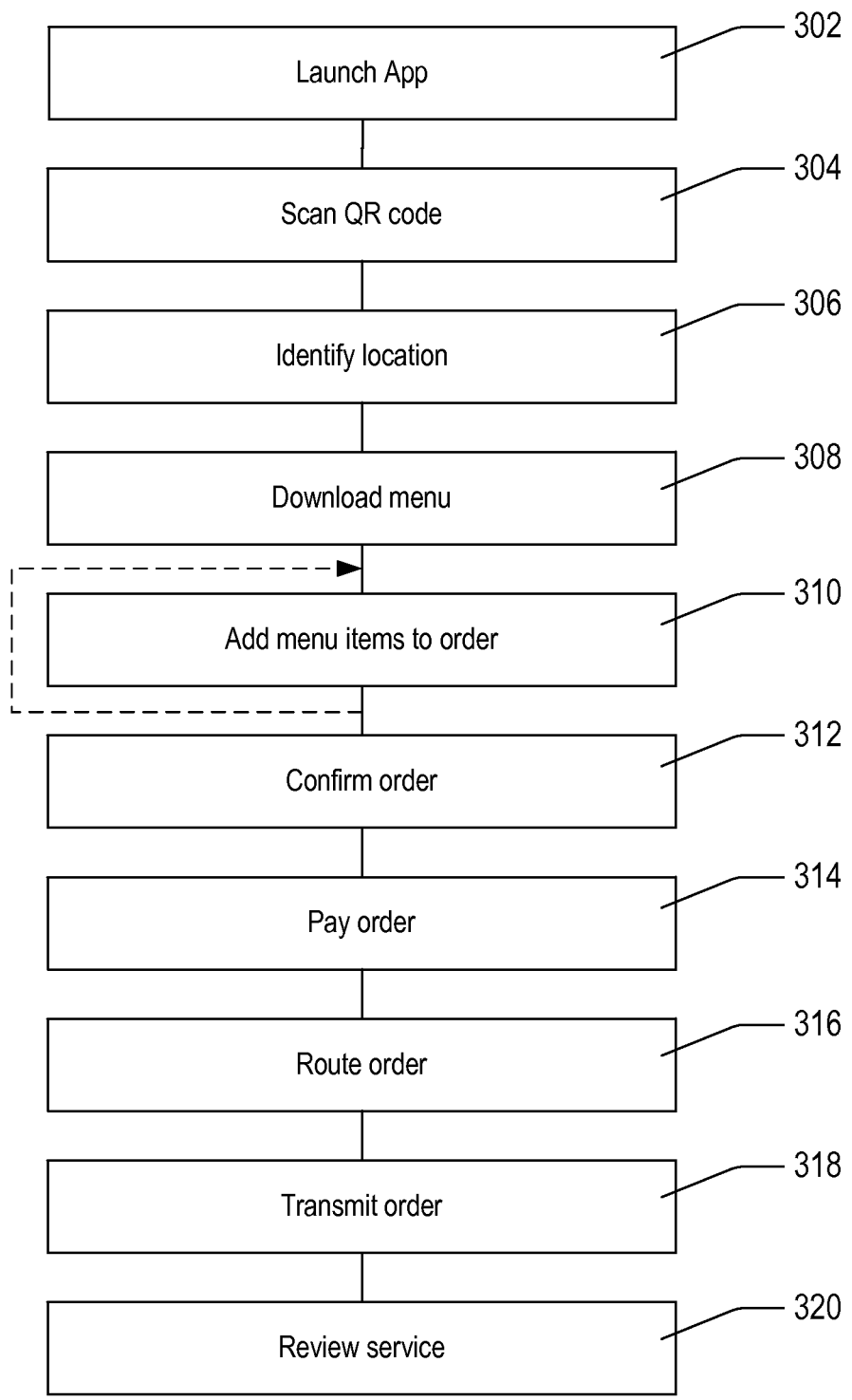
FIG. 3 is a flow chart of a method in accordance with an embodiment of the present disclosure.

With reference to FIG. 3, the following steps are performed:

302: Launch App.

The smartphone App is launched to begin the process. The App may previously have been downloaded and installed from one of the App stores such as Apple™, Android™, etc. A unique identifier for the customer may be provided by the device.

304: Scan QR code on table.

The App may use an embedded QR code scanner to control the camera and scan the QR code on the table. The restaurant and table identifiers are extracted from the QR code. Alternatively the restaurant id and table id can be keyed-in manually.

An alternative to the QR code and QR code scanner is to use an NFC (Near Field Communication) tag on the table and NFC reader where present in the smartphone. In this case, the location data is extracted by swiping the phone over the tag.

306: Identify location.

The location is identified using the restaurant and table identifier(s) extracted from the QR code. This location is used to identify the correct restaurant menu from the central platform database. The platform is accessed from the App on the smartphone by calling web services over the mobile data network. The mobile data network can be delivered using various over-the-air technologies including GPRS (General Packet Radio Service), 3G (3rd generation mobile telecommunications), LTE (Long Term Evolution), 4G (4th generation mobile telecommunications), WiFi.

308: Download menu.

The appropriate menu is downloaded over the air to the smartphone and the menu items are output to the smartphone display. The menu may be dependent on the restaurant location and the time of day.

310: Add menu items to order.

The user interacts with the digital menu in the App to select items from the menu. Items selected are added to the order. This step may be repeated, as indicated by the dashed line.

312: Confirm order.

The user can "checkout" by reviewing and confirming the order and then paying the bill.

314: Pay order.

The user may pay the waiter directly. The user can use a pre-stored credit or debit card to pay for the order. Additional cards can be added. Payment card information may be stored in encrypted form in a local database on the device or in a mobile wallet. Alternatively the payment card information can be stored centrally and accessed using the unique customer identifier. Where payment details are stored in other accounts such as social network accounts including Facebook™, Twitter™, Google+™, etc., the existing payment information can be accessed by signing in to the account. Payment systems such as Paypal™ may also be used.

316: Route order.

The restaurant identifier is used to determine and select the appropriate EPOS adaptor based on the EPOS system in use by the specific restaurant. The restaurant identifier is used to determine and select the appropriate communication protocol and communication network.

318: Transmit to restaurant.

The correct communication protocol and authentication details are then used in order to route the order to the restaurant EPOS system or printer.

320: Review on social networks.

The user has the ability to sign-in to their existing social network accounts and record a review of the service.

In some embodiments, the menu may be retrieved before the station (e.g. table) is known, for example while the customer is waiting to be seated, or before the customer arrives at the premises. In such a case steps 308 and 310 of downloading and adding menu items to the order may be initiated by for example scanning a QR code encoding or otherwise associated with the restaurant identifier, or for example clicking on a web link associated with the restaurant identifier. When the QR code on the table is subsequently scanned and a matching restaurant identifier is obtained, the pre-assembled order has the table number from the scanned QR code added to it and step 312 of confirming the order may be performed.

Figure 4:
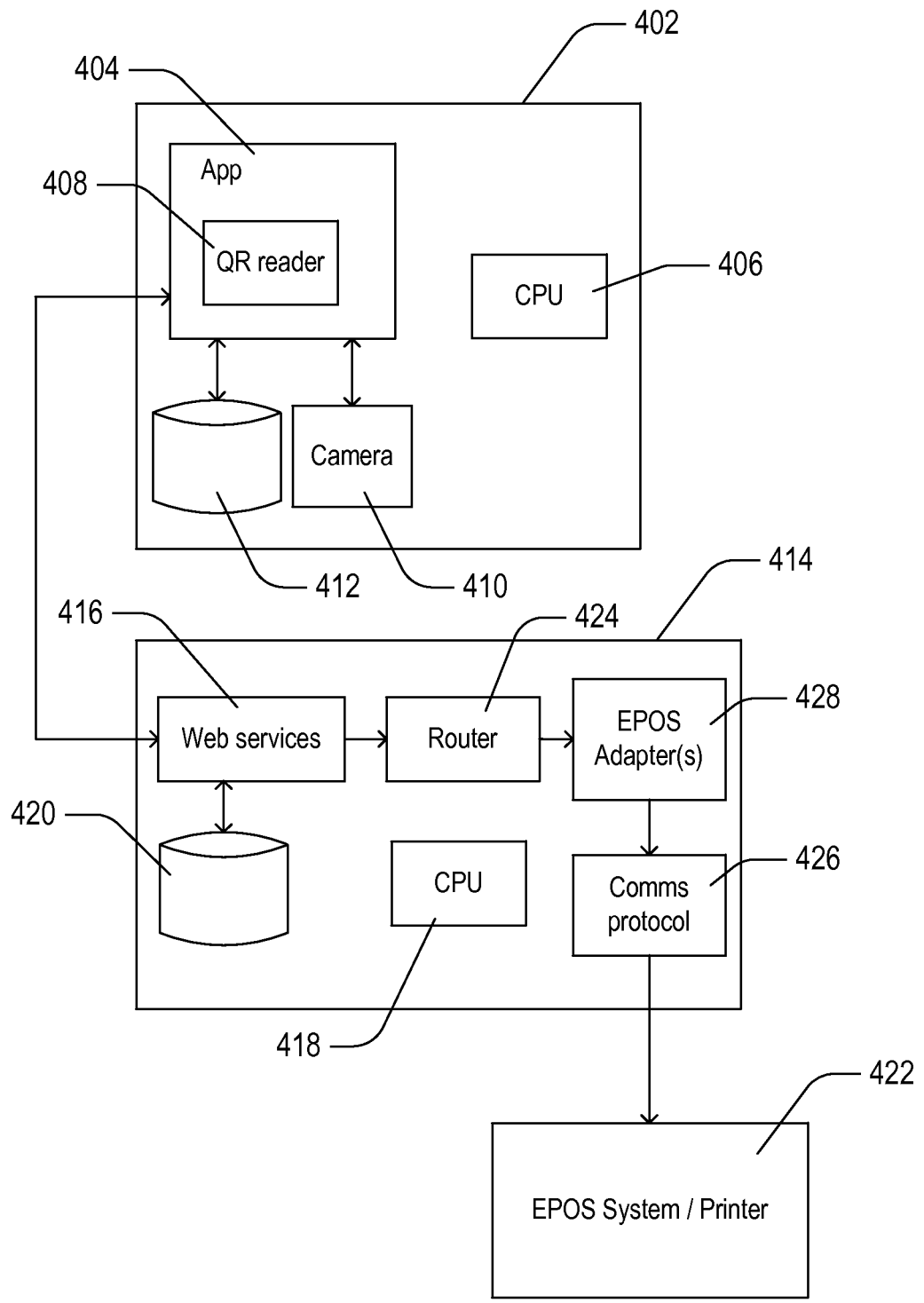
FIG. 4 illustrates a system according to an embodiment of the present disclosure.

With reference to FIG. 4, the Smartphone 402 has an App 404 stored in its memory. The App 404 may be downloaded and installed on the smartphone 402. When the one or more sequences of machine-readable program instructions of the App 404 are loaded into the CPU (Central Processing Unit)

406 of the smartphone, the CPU 406 executes the program instructions of the App. This causes the processor to execute the steps 302 to 312 of FIG. 3. The QR code reader 408 may be an embedded component within the App which accesses the camera 410. The App 404 accesses the database 412. The App 404 accesses the central platform 414 via web services 416 over a mobile data network, for example using Hypertext Transfer Protocol Secure (HTTPS).

The App may also be implemented as a mobile web application rather than an application downloaded and running on the device.

The database 412 on the smartphone 402 stores information such as the payment card details. Such information can be stored securely using techniques such as data encryption. Menu information downloaded from the platform database 420 may be cached locally on the smartphone for performance reasons. In this case, a check may be made when the application starts up to see if there is more recent menu data to download.

The camera 410 may be controlled by the QR code reader 408 within the App 402.

The platform 414 may be hosted centrally and accessed over the internet. There may be a number of components within the platform, and these are described below.

The platform implements web services for access by the smartphone App using a web services module 416. When the one or more sequences of machine-readable program instructions of the web services module 416 are loaded into the CPU 418 of the platform, the CPU 418 executes the program instructions of the web services module 416. Web service interfaces may use SOAP or REST technologies and use HTTP over internet protocol (IP) as the underlying communication method.

The central database 420 stores the restaurant, customer, order, and payment information. The remote EPOS system or printer 422 connection and authentication information is also stored.

The location information extracted from the read QR code may be used to retrieve the relevant EPOS and connection information for the restaurant.

The restaurant identifier may be used by the router module 424 to determine the appropriate EPOS adaptor based on the EPOS system 422 in use by the specific restaurant. The correct communication protocol 426 and authentication details are then determined by the router module 424 and/or CPU 418 and used in order to route the order to the restaurant EPOS system or printer. When the program instructions of the router module 424 are loaded into the CPU 418 of the platform, the CPU 418 executes the program instructions of the router module 424. This causes the processor to execute the steps 316 to 318 of FIG. 3.

EPOS providers support varying types of protocols for connection to those systems. The communication protocols are proprietary and interface methods used range from web service interfaces down to TTY protocols. Specific EPOS adaptors 428 may be implemented to support each individual type of EPOS system. The router module 424 identifies the EPOS adaptor 428 to use to deliver the order to a specific restaurant.

With respect to the communication protocol 426, remote connection to an EPOS system may use a secure wide-area network (WAN). The WAN type may be a dedicated line, dial-up modem or broadband connection. For security over the internet, a VPN (Virtual Private Network) connection is suitable.

The EPOS System/Printer 422 is the instance of an EPOS system deployed in a particular restaurant. As an alternative to integrating with a specific type of EPOS system, the order may be sent directly over the internet to a remote printer.

TABLE 1

| Service task | Full-counter service | Semi-counter service | Waiter service | Embodiment A | Embodiment B |
|---|---|---|---|---|---|
| Seat customer | | | V | | |
| Deliver menu | | | V | | |
| Take order/payment | V | V | | | |
| Take drinks order | | | V | | |
| Deliver food | V | V | V | V | V |
| Take first order | | | V | | |
| Deliver food | V | V | V | V | V |
| Take dessert order | V | V | V | | |
| Deliver food | V | V | V | V | V |
| Take payment | | | V | | V |

Table 1 shows the table visits (V indicates a table visit) by a waiter in each of the dining formats: full-counter service, semi-counter service and waiter service. Some of these visits can be eliminated through the use of embodiments of the present disclosure, denoted by columns headed Embodiment A and Embodiment B. Embodiment B differs from Embodiment A by the customer paying the serving staff/waiter directly, rather than using the App. The efficiency improvements and therefore cost savings provided by embodiments of the present disclosure may be calculated based on the reduction in table visits or ordering time.

Figure 5:
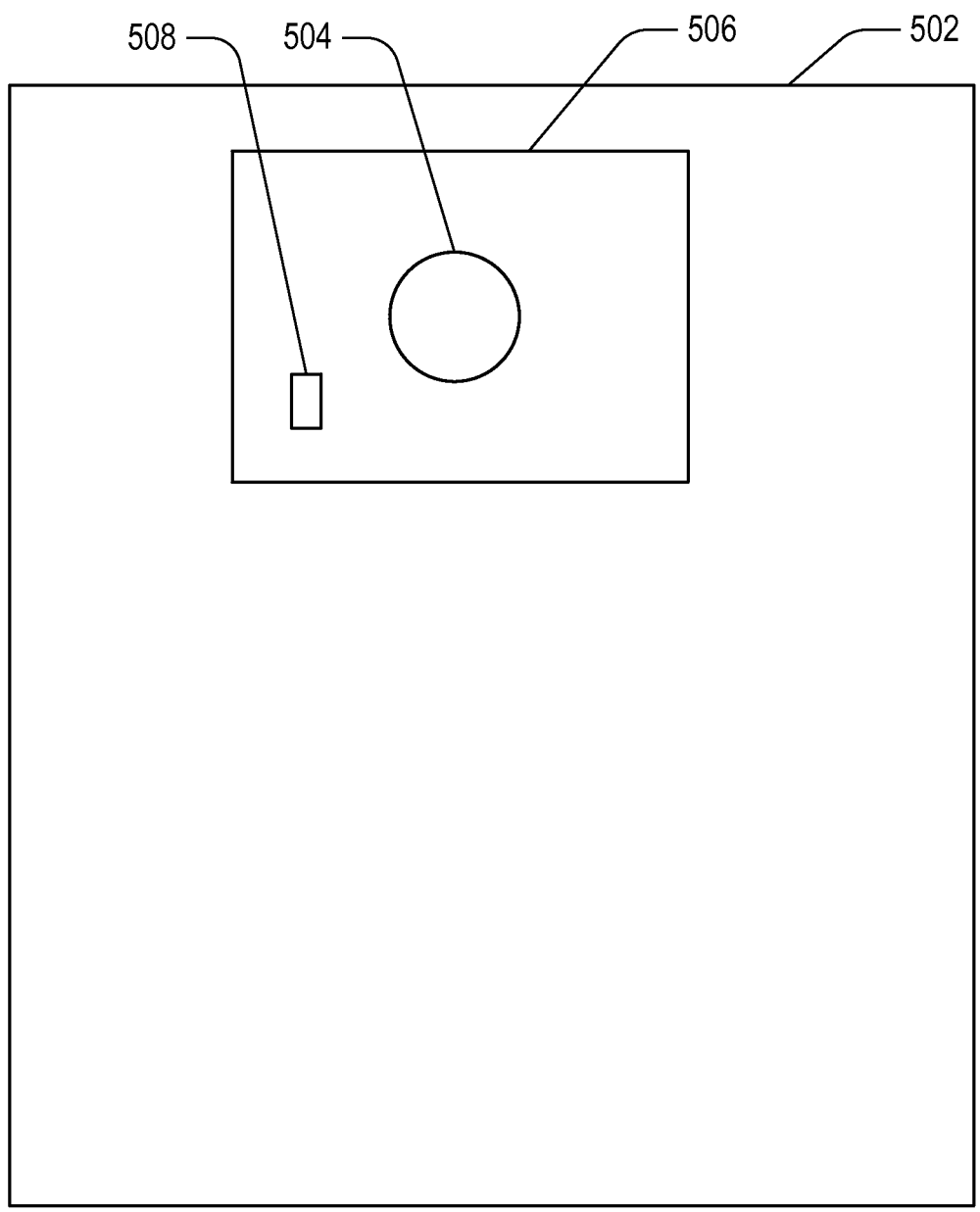
FIG. 5 illustrates a premises with an ordered product delivered to a station.

FIG. 5 illustrates a premises 502 with an ordered product 504 having been delivered to a station 506. An electronic NFC 508 tag is shown at the station, having been used to order the product in accordance with an embodiment.

Embodiments provide a process of scanning a QR code to identify the physical location, automatically selecting the menu and subsequently routing the order to the correct EPOS system.

The QR code may be used to identify the location, and may not be a fixed web URL as in normal usage.

Embodiments provide a system which selects the appropriate menu and subsequently routes the order to the EPOS system in the appropriate restaurant using the correct communications protocol all based on the physical location from the QR code.

Embodiments may include the steps of:

Scanning a QR code from the App. The QR code contains the physical location (restaurant and table identifier).

Automatically selecting the relevant menu for the restaurant and time of day.

Routing the order to the appropriate EPOS system using the correct protocol and network.

Further embodiments may include the variations:

Extend to other restaurant types—e.g. use even when waiter table ordering is available.

Rather than a table, a station may be another sub-location of a premises, such as a seat or a location such as a pillar, or corner, or a point or region defined by coordinate data.

Embodiments of the present disclosure may be used at other fixed-point locations such as hotel rooms and stadia (e.g. baseball).

Can key-in restaurant id and table id instead of scanning QR code.

QR code can be a URL with encoded identifiers or encode the restaurant and table identifiers directly.

Other 2D barcode symbologies could be used as an alternative to QR codes. e.g. Datamatrix™, Aztec™.

The QR code could also be replaced or supplemented by an NFC tag and read by an in-phone NFC reader.

Could also use a mobile web application rather than a downloaded App.

As well as EPOS system or a remote printer, the orders could be accessed from a web browser in the kitchen or even sent via email.

The system can also be implemented on other mobile devices such as tablet computers like the Apple™ iPad™ or Android™ tablets.

The QR code or other tag may be placed on a menu that is kept with or associated with the table.

The mobile device may be provided by the proprietor of the premises, such as the restaurant owner, with appropriate security measures to prevent or deter theft.

The invention claimed is:

1. A method of ordering menu items for delivery to a station at a premises, the method comprising the steps:
    (a) a mobile device running an application interacting with a physical tag to receive a station input, the station input comprising a station identifier and a premises identifier together identifying the station at the premises, the premises identifier defining a venue and the station identifier defining a location within the venue;
    (b) the mobile device retrieving a menu over the internet from a platform, the platform comprising a web-based server, and the menu comprising menu items and being automatically selected from a database at the platform based on the premises identifier;
    (c) the mobile device displaying the retrieved menu;
    (d) the mobile device receiving an order input, the order input indicating a selection of at least one of the output menu items;
    (e) the mobile device sending the order input over the internet to the platform;
    (f) a processor of the platform using the premises identifier to automatically determine and select an appropriate electronic point of sale (EPOS) adapter from a number of stored EPOS adapters, together with a corresponding communication protocol and a corresponding communication network; and
    (g) the processor of the platform automatically causing transmission of an order to the premises identified by the input premises identifier, the order including the station identifier and the selection of the at least one of the output menu items, wherein the at least one processor transmits the order to the premises using the selected EPOS adapter, the selected communication protocol and the selected communication network, whereby electronic ordering is enabled without the need to install a dedicated system for the venue.

2. The method of claim 1, wherein the station comprises a table.

3. The method of claim 1, wherein the tag comprises a barcode and the mobile device reads the barcode at the station.

4. The method of claim 3, wherein the barcode comprises the station identifier and the premises identifier.

5. The method of claim 1, wherein the tag comprises a QR code comprising encoded station and premises identifiers and the mobile device reads the QR code.

6. The method of claim 1, wherein the tag comprises an electronic tag and the mobile device receives a transmission from the electronic tag at the station.

7. The method of claim 6, wherein the transmission from the electronic tag comprises the station identifier and the premises identifier.

8. The method of claim 1, wherein the mobile device retrieves the menu from the platform via web services.

9. The method of claim 1, wherein the menu is automatically configured for the premises based on time of day.

10. The method of claim 1, wherein steps (b) to (d) are performed before steps (a), (e) and (f).

11. A method of delivering products to a station at a premises, the method comprising ordering menu items in accordance with the method of claim 1 and delivering to the station at the premises at least one product corresponding to the selection of the output menu items.

12. A non-transitory computer program product comprising one or more sequences of machine-readable instructions for execution by a mobile device and for use in ordering menu items for delivery to a station at a premises, the instructions being adapted to:
    cause the mobile device running the non-transitory computer program product to interact with a physical tag to receive a station input, the station input comprising a station identifier and a premises identifier together identifying the station at the premises, the premises identifier defining a venue and the station identifier defining a location within the venue, so as to enable automatic selection of an appropriate electronic point of sale (EPOS) adapter from a number of EPOS adapters stored in a platform based on at least the premises identifier and thereby facilitate communication between the mobile device and the premises through the platform, the platform comprising a web-based server;
    cause the mobile device to retrieve a menu over the internet from the platform, the menu comprising menu items and being selected from a database at the platform based on at least the premises identifier;
    cause the mobile device to display the retrieved menu;
    cause the mobile device to receive an order input, the order input indicating a selection of at least one of the output menu items; and
    cause the mobile device to send the order input over the internet to the platform and automatically from the platform to the premises using the selected EPOS adapter, whereby electronic ordering is enabled without the need to install a dedicated system for the venue.

13. A system for ordering menu items for delivery to a station at a premises, the system comprising:
    a mobile device running an application operable to:
    (a) interact with a physical tag to receive a station input, the station input comprising a station identifier and a premises identifier together identifying the station at the premises, the premises identifier defining a venue and the station identifier defining a location within the venue;
    (b) retrieve a menu over the internet from a platform, the platform comprising a web-based server, the menu comprising menu items and being automatically selected from a database at the platform based on the premises identifier;
    (c) display the retrieved menu;
    (d) receive an order input, the order input indicating a selection of at least one of the output menu items; and
    (e) send the order input over the internet to the platform;
    and the system further comprising:
    the platform remote from the premises for communicating over the internet with the mobile device and further comprising a number of stored EPOS adapters and a processor operable to:
    use the premises identifier to automatically determine and select an electronic point of sale (EPOS) adapter from a number of stored EPOS adapters, together with a corresponding communication protocol and a corresponding communication network; and to cause automatic transmission of an order to the premises identified by the input premises identifier, the order including the station identifier and the selection of the output menu items, wherein the processor causes automatic transmission of the order to the premises using the selected EPOS adapter, the selected communication protocol and the selected communication network, whereby electronic ordering is enabled without the need to install a dedicated system for the venue.

14. A non-transitory computer program product comprising one or more sequences of machine-readable instructions for execution by a platform, the platform comprising a web-based server, and being adapted to:

cause the platform to receive over the internet a station input and a request for a menu from a mobile device running an application, the station input comprising a station identifier and a premises identifier together identifying the station at the premises, the premises identifier defining a venue and the station identifier defining a location within the venue;

cause the platform to automatically send a menu over the internet to the mobile device;

cause the processor to receive an order over the internet from the mobile device;

cause a processor of the platform to automatically select, using the premises identifier, an appropriate electronic point of sale (EPOS) adapter from a number of stored EPOS adapters, together with a corresponding communication protocol and a corresponding communication network;

and to cause automatic transmission of the order to the premises identified by the input premises identifier, the order including the station identifier and the selection of the output menu items, wherein the at least one computer causes automatic transmission of the order to the premises using the selected EPOS adapter, the selected communication protocol and the selected communication network, whereby electronic ordering is enabled without the need to install a dedicated system for the venue.

15. The non-transitory computer program product of claim 12, being provided as a downloadable application for a mobile device.

16. The non-transitory computer program product of claim 12, being provided as a mobile web application.

* * * * *